(12) United States Patent
Venkataraman et al.

(10) Patent No.: US 12,047,424 B2
(45) Date of Patent: Jul. 23, 2024

(54) IMS SUPPORT FOR NON-VOICE SERVICES

(71) Applicant: Apple Inc., Cupertino, CA (US)

(72) Inventors: Vijay Venkataraman, San Jose, CA (US); Kavya B. Ravikumar, San Diego, CA (US); Krisztian Kiss, Hayward, CA (US); Longda Xing, San Jose, CA (US); Srinivasan Nimmala, San Jose, CA (US); Tong Liu, San Diego, CA (US); Utkarsh Kumar, San Jose, CA (US); Yifan Zhu, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 17/248,881

(22) Filed: Feb. 11, 2021

(65) Prior Publication Data
US 2021/0250384 A1   Aug. 12, 2021

Related U.S. Application Data

(60) Provisional application No. 62/975,283, filed on Feb. 12, 2020.

(51) Int. Cl.
| | |
|---|---|
| *H04L 65/1016* | (2022.01) |
| *H04L 51/58* | (2022.01) |
| *H04L 65/1069* | (2022.01) |
| *H04L 65/1104* | (2022.01) |
| *H04W 4/14* | (2009.01) |
| *H04W 60/04* | (2009.01) |
| *H04W 84/04* | (2009.01) |

(52) U.S. Cl.
CPC ......... *H04L 65/1016* (2013.01); *H04L 51/58* (2022.05); *H04L 65/1069* (2013.01); *H04L 65/1104* (2022.05); *H04W 4/14* (2013.01); *H04W 60/04* (2013.01); *H04W 84/042* (2013.01)

(58) Field of Classification Search
CPC ................ H04L 65/1016; H04L 51/38; H04L 65/1006; H04L 65/1069; H04L 65/1073; H04L 65/4061; H04L 67/30; H04W 4/14; H04W 60/04; H04W 84/042; H04W 60/00; H04W 68/005; H04W 68/12; H04W 76/10; H04W 76/16; H04W 76/18; H04W 84/12; H04W 60/005; H04W 60/02; H04W 60/06; H04W 68/02; H04W 68/04; H04W 76/19; H04W 4/60; H04W 8/04; H04W 8/18; H04W 8/183; H04W 88/06

See application file for complete search history.

(56) References Cited

U.S. PATENT DOCUMENTS

10,264,413 B1 * 4/2019 Bogineni ................ H04W 4/12
11,197,230 B2 * 12/2021 Jain ......................... H04W 8/02
(Continued)

*Primary Examiner* — Greg C Bengzon
(74) *Attorney, Agent, or Firm* — Fay Kaplun & Marcin, LLP (57) ABSTRACT

A user equipment (UE) is configured with operations to determine whether a network supports non-voice IP Multimedia Subsystem (IMS) services. The UE determines whether a network with which the UE is communicating supports a non-voice IP Multimedia Subsystem (IMS) service and when the network supports the non-voice IMS service, initiates an IMS Protocol Data Unit (PDU) session establishment with the network.

20 Claims, 8 Drawing Sheets

(56) References Cited

U.S. PATENT DOCUMENTS

| | | | | |
|---|---|---|---|---|
| 2010/0329244 | A1* | 12/2010 | Buckley | H04L 65/1016 370/352 |
| 2011/0305192 | A1* | 12/2011 | Faccin | H04W 48/18 370/328 |
| 2014/0153408 | A1* | 6/2014 | Jun | H04L 65/1066 370/250 |
| 2014/0215078 | A1* | 7/2014 | Seth | G06F 9/4552 709/226 |
| 2015/0055550 | A1* | 2/2015 | Suryavanshi | H04L 65/1104 370/328 |
| 2015/0327207 | A1* | 11/2015 | Bharadwaj | H04L 65/4061 455/435.2 |
| 2019/0029065 | A1* | 1/2019 | Park | H04W 48/02 |
| 2019/0037629 | A1* | 1/2019 | Ryu | H04W 76/28 |
| 2020/0077356 | A1* | 3/2020 | Youn | H04W 52/0209 |
| 2020/0196375 | A1* | 6/2020 | Ryu | H04W 76/34 |
| 2020/0252849 | A1* | 8/2020 | Tang | H04W 8/08 |
| 2020/0288367 | A1* | 9/2020 | Kim | H04W 36/36 |
| 2020/0305118 | A1* | 9/2020 | Ryu | H04W 76/10 |
| 2021/0152615 | A1* | 5/2021 | Karampatsis | H04W 40/22 |
| 2021/0227596 | A1* | 7/2021 | Aramoto | H04W 76/18 |
| 2021/0250384 | A1* | 8/2021 | Venkataraman | H04L 65/1073 |
| 2021/0282057 | A1* | 9/2021 | Wu | H04L 65/1104 |
| 2021/0360567 | A1* | 11/2021 | Tiwari | H04W 12/08 |
| 2022/0046737 | A1* | 2/2022 | Yang | H04W 76/16 |
| 2022/0053449 | A1* | 2/2022 | Shan | H04W 4/40 |
| 2022/0103987 | A1* | 3/2022 | Shan | H04W 4/40 |
| 2022/0132455 | A1* | 4/2022 | Gupta | H04W 60/00 |
| 2022/0167244 | A1* | 5/2022 | Zaus | H04W 36/08 |

* cited by examiner

Fig. 8

IMS SUPPORT FOR NON-VOICE SERVICES

BACKGROUND

A cellular network may include an IP Multimedia Subsystem (IMS). The IMS may be generally described as an architecture for delivering multimedia services to a user equipment (UE) using the IP protocol. Typically, the IMS is associated with providing the UE with voice services (e.g., VoIP, VoLTE, VoPS, etc.). However, the IMS may also support other non-voice services such as video services, Short Messaging Services (SMS) and Rich Communications Services (RCS).

SUMMARY

Some exemplary embodiments are related to a processor of a user equipment (UE) configured to perform operations. The operations include determining whether a network with which the UE is communicating supports a non-voice IP Multimedia Subsystem (IMS) service and when the network supports the non-voice IMS service, initiating an IMS Protocol Data Unit (PDU) session establishment with the network.

Other exemplary embodiments are related to a user equipment (UE) that includes a transceiver configured to communicate with a network and a processor communicatively coupled to the transceiver and configured to perform operations. The operations include determining whether the network supports a non-voice IP Multimedia Subsystem (IMS) service and when the network supports the non-voice IMS service, initiating an IMS Protocol Data Unit (PDU) session establishment with the network.

Still further exemplary embodiments are related to a processor of a user equipment (UE) configured to perform operations. The operations include determining that a network with which the UE is communicating does not support an IP Multimedia Subsystem (IMS) voice over PS (VoPS) service, initiating an IMS Protocol Data Unit (PDU) session establishment with the network, receiving an IMS PDU session rejection including a cause code indicating whether the network supports a non-voice IMS service and when the cause code indicates the network supports the non-voice IMS service, initiating a second IMS PDU session establishment with the network.

DETAILED DESCRIPTION

The exemplary embodiments may be further understood with reference to the following description and the related appended drawings, wherein like elements are provided with the same reference numerals. The exemplary embodiments relate to determining when a UE should attempt to establish an IMS protocol data unit (PDU) session when connecting to a network. The exemplary embodiments may be used when the network indicates that IMS voice related services are not available but there may be other non-voice IMS services that are supported by the network.

In the exemplary embodiments, the non-voice IMS services are described as including Short Messaging Services (SMS) and Rich communications services (RCS). However, it should be understood that the exemplary embodiments may be used with any non-voice IMS services that are offered by the network with which a UE is communicating or to which the UE has connected, e.g., any service provided via a network slice connected to IMS Data network name (DNN).

The exemplary embodiments are described with regard to the UE. However, the use of a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

In addition, the exemplary embodiments are described with reference to the network being a 5G New Radio (NR) network. However, it should be understood that the exemplary embodiments may be implemented in any network (cellular or non-cellular) in accordance with the principles of operation described herein for the 5G NR network.

Figure 1:
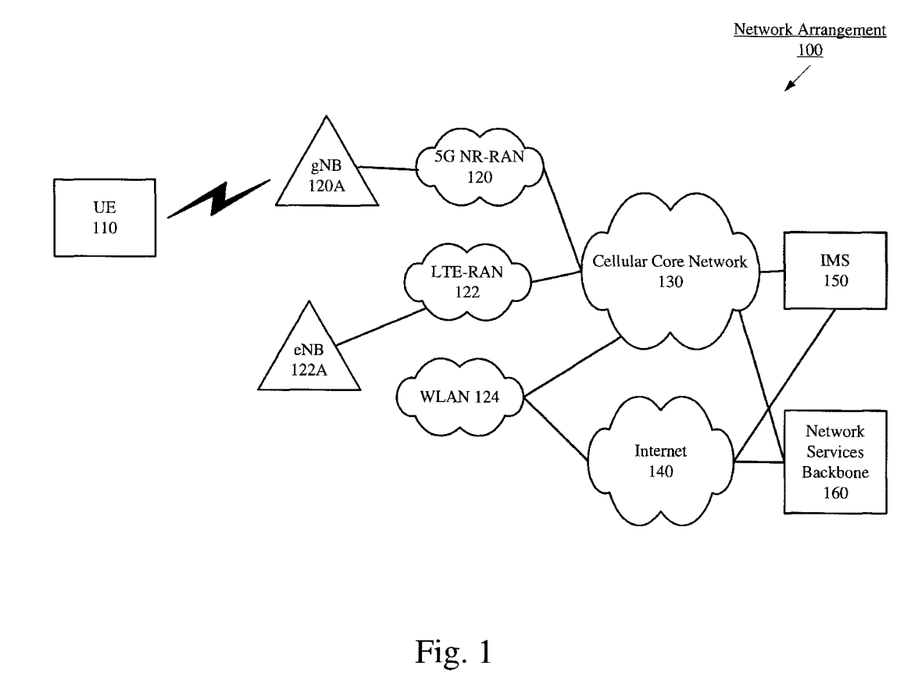
FIG. 1 shows an exemplary network arrangement according to various exemplary embodiments.

FIG. 1 shows an exemplary network arrangement 100 according to various exemplary embodiments. The exemplary network arrangement 100 includes a UEs 110. Those skilled in the art will understand that the UE 110 may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of one UE 110 is merely provided for illustrative purposes.

The UE 110 may communicate directly with one or more networks. In the example of the network configuration 100, the networks with which the UE 110 may wirelessly communicate are a 5G NR radio access network (5G NR-RAN) 120, an LTE radio access network (LTE-RAN) 122 and a wireless local access network (WLAN) 124. The UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110 may connect to the 5G NR-RAN via the gNB 120A. The gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to a single gNB 120A is merely for illustrative purposes. The exemplary embodiments may apply to any appropriate number of gNBs. The UE 110 may also connect to the LTE-RAN 122 via the eNB 122A.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Typically, when the UE 110 registers with the network (e.g., the 5G NR-RAN 120), the UE 110 will receive a registration accept message that includes an IMS Voice over PS (VoPS) field. This field will indicate if the particular 5G NR-RAN 120 and cellular core network 130 to which the UE 110 has connected supports IMS VoPS. If both the 5G NR-RAN 120 and the UE 110 support IMS VoPS, the UE 110 will then attempt to establish an IMS PDU session. Once the PDU session is established, the UE 110 will initiate a Session Initiation Protocol (SIP) registration over the IMS PDU session. When this is completed the UE 110 may utilize the VoPS services offered by the 5G NR-RAN 120.

When the registration accept message includes an IMS VoPS field indicating that the 5G NR-RAN 120 does not support IMS VoPS, the UE 110 will not attempt to initiate the IMS PDU session. However, the 5G NR-RAN 120 may support other non-voice IMS services. If the UE 110 does not establish the IMS PDU session, the UE 110 will not be able to access these other non-voice services. On the other hand, if the 5G NR-RAN does not support the other non-voice IMS services and the UE 110 attempts to establish the IMS PDU session, the UE 110 will be rejected by the 5G NR-RAN 120. Thus, in this case, the initiation of the IMS PDU session will result in unnecessary signaling and power drain for the UE 110. In some extreme cases, the UE 110 may end up in an IMS PDU session establishment loop. There may also be the reverse scenario where, though the network indicates IMS VoPS as a supported service, the UE 110 does not support IMS Voice services. However, the UE 110 does support, for example, RCS over IMS. In this scenario, it is unclear to the UE whether to attempt an IMS PDU Session establishment procedure.

The exemplary embodiments provide various methods for the UE 110 to determine whether to attempt to establish the IMS PDU session for non-voice services when the network has indicated that the IMS VoPS services are not available. These various methods will be described in more detail below.

Figure 2:
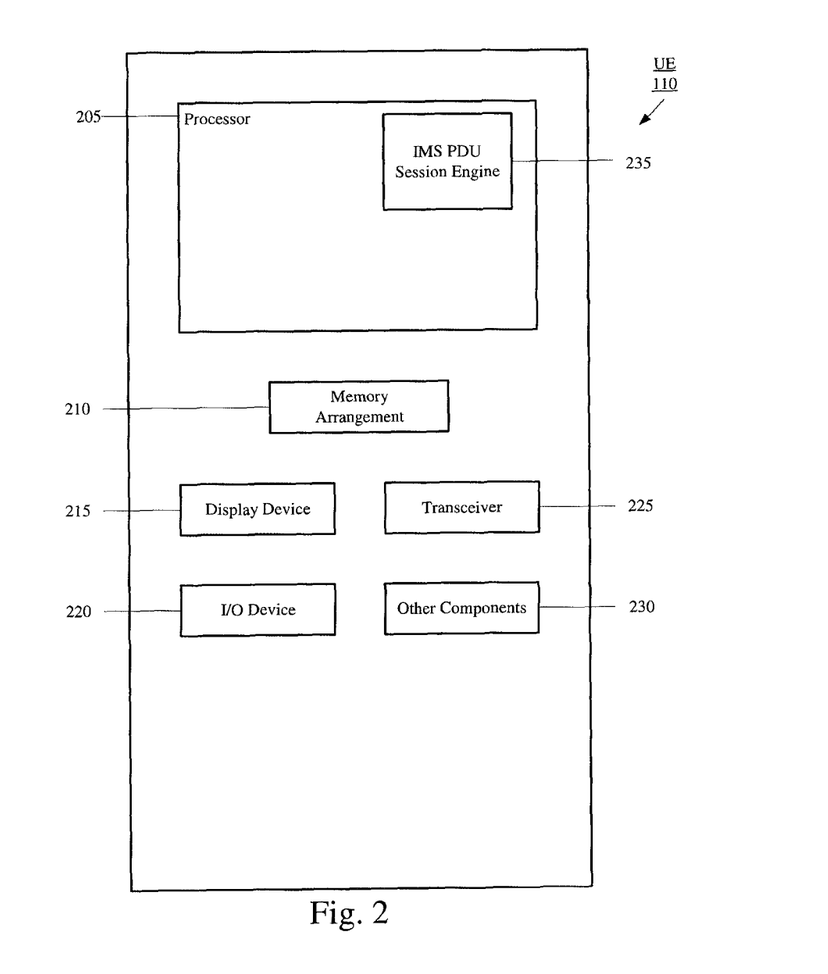
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225, and other components 230. The other components 230 may include, for example, a SIM card, an embedded SIM (eSIM), an audio input device, an audio output device, a power supply, a data acquisition device, ports to electrically connect the UE 110 to other electronic devices, etc.

The processor 205 may be configured to execute a plurality of engines of the UE 110. For example, the engines may include an IMS PDU session engine 235. The IMS PDU session engine 235 may be used to determine whether to attempt to establish the IMS PDU session for non-voice services when the network has indicated that the IMS VoPS services are not available.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the WLAN 122, etc.

Accordingly, the transceiver 225 may operate on a variety of different frequencies or channels (e.g., set of consecutive frequencies).

Figure 3:
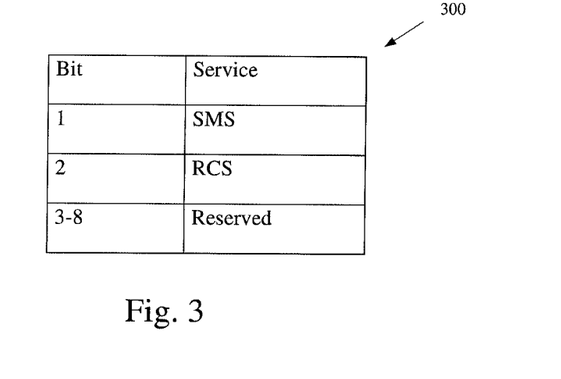
FIG. 3 shows an exemplary table for a non-voice IMS service information element (IE) that indicates network support for various non-voice IMS services according to the exemplary embodiments.

FIG. 3 shows an exemplary table 300 for a non-voice IMS service information element (IE) that indicates network support for various non-voice IMS services according to the exemplary embodiments. As described above, when the UE 110 registers with the 5G NR-RAN the UE 110 will receive a registration accept message that includes an IE indicating whether the 5G NR-RAN supports IMS VoPS services. The table 300 shows properties of a separate non-voice IMS service IE that may be included in the registration accept message that provides information as to whether the 5G NR-RAN supports non-voice IMS services. In this example, the non-voice IMS service IE may be considered to be a 1 byte (8 bit) IE. The first bit may indicate whether the 5G NR-RAN 120 supports an IMS SMS service. The second bit may indicate whether the 5G NR-RAN 120 supports an IMS RCS service. The third through eighth bits may be reserved to be used for other non-voice services as needed.

As described above, the exemplary embodiments are described with reference to the non-voice IMS services being an SMS or RCS service. However, as can be seen from table 300, multiple other non-voice IMS services may be accommodated by the non-voice IMS service IE described by table 300. In addition, if more than eight (8) non-voice IMS services are offered by the network, the non-voice IMS service IE may be expanded to accommodate additional services. Moreover, while it is described that the non-voice IMS service IE may be included as part of the registration accept message, it should be understood that the non-voice IMS service IE may be sent as part of a different message either during the registration procedure or after the registration procedure.

In another exemplary embodiment, a new IE may be used that indicates whether IMS interworking is supported for "Non-voice" services. This IE, as opposed to the IE described above with reference to FIG. 3, may be a boolean true/false value. Thus, in this exemplary embodiment there may be the current IMS VoPS field which indicates IMS interworking supported for voice, and a new IMS Non-VoPS field that may be used as a general indicator to the UE 110 as to whether IMS interworking is supported for non-voice services.

Figure 4:
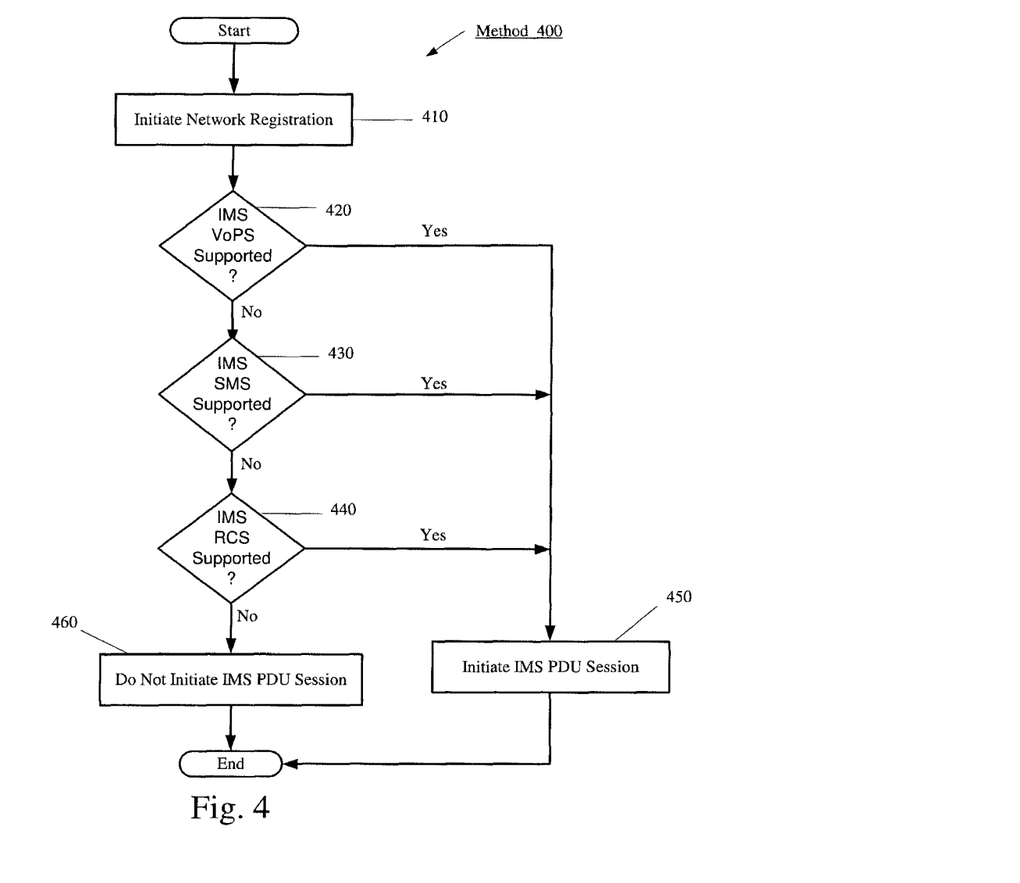
FIG. 4 shows an exemplary method of UE operation when receiving the non-voice IMS service IE according to various exemplary embodiments.

FIG. 4 shows an exemplary method 400 of UE 110 operation when receiving the non-voice IMS service IE according to various exemplary embodiments. The method 400 will be described with reference to the exemplary network arrangement of FIG. 1, the exemplary UE 110 of FIG. 2 and the non-voice IMS service IE of FIG. 3. The method 400 provides a manner of determining whether the UE 110 should attempt to establish an IMS PDU session when the 5G NR-RAN 120 indicates that IMS VoPS is not supported. The determination is based on the non-voice IMS service IE as described below.

In 410, the UE 110 will initiate a network registration procedure with the 5G NR-RAN 120. Those skilled in the art will understand the operations involved in the network registration procedure. When the registration is successful, the 5G NR-RAN 120 will send a registration accept message to the UE 110. The registration accept message will include the IE corresponding to the IMS VoPS services and the non-voice IMS service IE.

In 420, the UE 110 will determine if the 5G NR-RAN supports IMS VoPS services based on the IMS VoPS services IE in the registration accept message. If the 5G NR-RAN 120 supports the IMS VoPS services, the method 400 will proceed to 450 where the UE 110 will initiate the IMS PDU session establishment. If the 5G NR-RAN does not support the IMS VoPS services, the method 400 will proceed to 430 where the UE 110 will determine if the 5G NR-RAN supports IMS SMS services based on the non-voice IMS services IE in the registration accept message. If the 5G NR-RAN 120 supports the IMS SMS services, the method 400 will proceed to 450 where the UE 110 will initiate the IMS PDU session establishment. If the 5G NR-RAN does not support the IMS SMS services, the method 400 will proceed to 440 where the UE 110 will determine if the 5G NR-RAN supports IMS RCS services based on the non-voice IMS services IE in the registration accept message.

If the 5G NR-RAN 120 supports the IMS RCS services, the method 400 will proceed to 450 where the UE 110 will initiate the IMS PDU session establishment. If the 5G NR-RAN does not support the IMS RCS services, the method 400 will proceed to 460 where the UE 110 will not initiate the IMS PDU session establishment. Thus, in the method 400, the UE 110 may determine whether to initiate the IMS PDU session establishment based on the information included in the non-voice IMS services IE when it is determined that the 5G NR-RAN 120 does not support IMS VoPS services. In this manner, the UE 110 will establish the IMS PDU session when one or more of the non-voice IMS services are available and avoid attempting to initiate the IMS PDU session establishment when there are no non-voice IMS services available. In this manner, the UE 110 will connect to available IMS services, but not waste signaling and power when the IMS services are not available.

Those skilled in the art will understand that the method 400 may be extended to account for additional IMS services that may be included in the non-voice IMS services IE. In addition, while it was not specifically stated in the description of method 400, the UE 110 must also support the corresponding IMS service that is supported by the 5G NR-RAN 120. For example, if the only IMS service that is supported by the 5G NR-RAN is the IMS SMS service, but the UE 110 does not support the IMS SMS service, the UE 110 will not attempt to initiate the IMS PDU session establishment for an IMS service that the UE 110 does not support.

Figure 5:
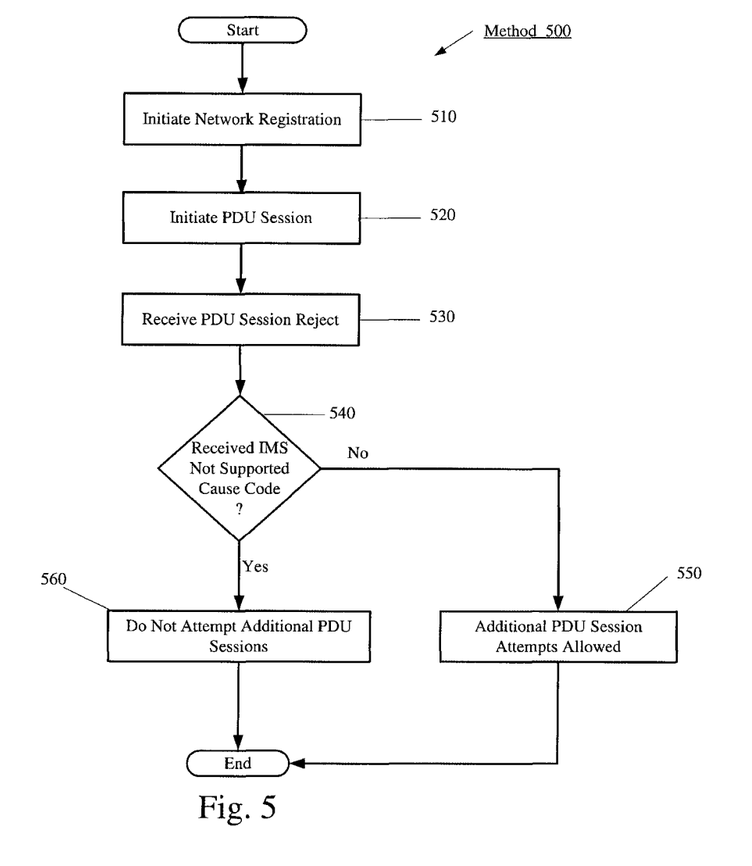
FIG. 5 shows an exemplary method of UE operation when receiving a cause code when a Protocol Data Unit (PDU) session is rejected according to various exemplary embodiments.

FIG. 5 shows an exemplary method 500 of UE 110 operation when receiving a cause code when a PDU session establishment request is rejected according to various exemplary embodiments. The method 500 will be described with reference to the exemplary network arrangement of FIG. 1 and the exemplary UE 110 of FIG. 2. The method 500 provides a manner of operation for the UE 110 when an IMS PDU session is rejected by the network. In the method 400 of FIG. 4, the UE 110 determined whether the UE 110 should attempt the IMS PDU session establishment for non-voice IMS services based on the non-voice IMS services IE. In the method 500 of FIG. 5, the UE 110 will attempt, at least a single time, to establish an IMS PDU session when the 5G NR-RAN 120 indicates that IMS VoPS is not supported. As opposed to the method 400 of FIG. 4, it may be considered that in this example, the 5G NR-RAN 120 does not support the non-voice IMS services IE, thus the UE 110 will not receive any indication from the network as to the supported non-voice IMS services during the registration procedure.

In 510, the UE 110 will initiate a network registration procedure with the 5G NR-RAN 120. Those skilled in the art will understand the operations involved in the network registration procedure. When the registration is successful, the 5G NR-RAN 120 will send a registration accept message to the UE 110. The registration accept message will include the IE corresponding to the IMS VoPS services. In this exemplary embodiment, it may be considered that the IMS VoPS service IE indicates that the 5G NR-RAN 120 does not support IMS VoPS services.

In 520, the UE 110 will initiate an IMS PDU session establishment procedure with the core network 130 via the 5G NR-RAN 120. The UE 110 will initiate this procedure despite the fact that IMS VoPS services are not available. The purpose of this procedure is to determine whether the 5G NR-RAN 120 supports any non-voice IMS services. As described above, the UE 110 will not receive any indication as to the support of non-voice IMS services during the registration procedure. Thus, the UE 110 will attempt to initiate the IMS PDU session establishment to determine if any non-voice IMS services are supported.

In this example, it may be considered that the 5G NR-RAN 120 rejects the IMS PDU session establishment by sending a PDU Session Establishment Reject message to the UE 110 in 530. However, the receipt of the PDU Session Establishment Reject message will not, on its own, indicate to the UE 110 whether non-voice IMS services are available. For example, the IMS PDU session may have been rejected for a reason unrelated to the availability of non-voice IMS services, e.g. congestion. Thus, in this example, as part of the PDU Session Establishment Reject message, the 5G NR-RAN 120 may include a cause code indicating that the 5G NR-RAN 120 does not support the non-voice IMS services.

In 540, the UE 110 will evaluate the PDU Session Establishment Reject message to determine if it includes the cause code indicating that non-voice IMS services are not supported. If the cause code is not included in the PDU Session Establishment Reject message, the UE 110 may initiate additional PDU session establishment attempts as shown in 550, after some backoff time. If the cause code is included in the PDU Session Establishment Reject message, the UE 110 may not initiate additional PDU session establishment attempts as shown in 560. Thus, in the method 500, the UE 110 may attempt an initial IMS PDU session establishment when the 5G NR-RAN 120 indicates that IMS VoPS services are not supported to determine if non-voice IMS services are supported. However, after a rejection of the initial attempt, any additional attempts at establishing the IMS PDU session are based on the cause code feedback from the network.

Similar to the method of FIG. 4, the UE 110 will only attempt the IMS PDU session establishment if the UE 110 supports one or more of the non-voice IMS services.

Figure 6:
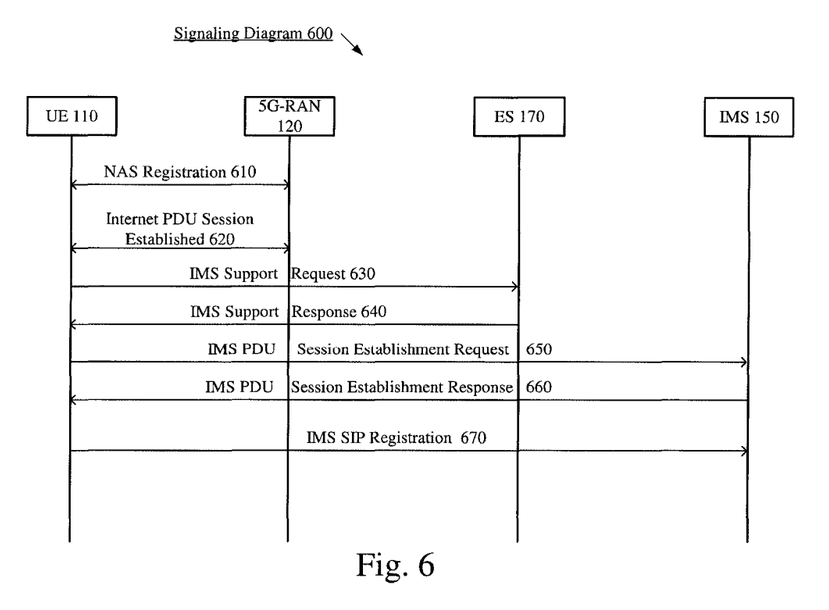
FIG. 6 shows an exemplary signaling diagram where the UE contacts an entitlement server (ES) to determine whether the network supports non-voice IMS services according to various exemplary embodiments.

FIG. 6 shows an exemplary signaling diagram 600 where the UE 110 contacts an entitlement server (ES) 170 to determine whether the network supports non-voice IMS services according to various exemplary embodiments. The signaling diagram 600 will be described with reference to the exemplary network arrangement of FIG. 1 and the exemplary UE 110 of FIG. 2. The ES 170 may be considered to be a server that is deployed on a per public land mobile network (PLMN) basis. It should be understood that each PLMN may have multiple ESs. The ES 170 may be programmed by the carrier or another entity and may include information about the feature set support for the PLMN. This feature set support may include the support for the non-voice IMS services. The ES 170 may reside in the core network 130 or may reside separate from the core network 130, e.g., in the 5G NR-RAN 120, as a separate entity such as the IMS 150, in the Internet 140 and is programmed by a third party, etc. In the signaling diagram 600, it may be considered that the UE 110 has been informed that the 5G NR-RAN 120 does not support IMS VoPS services.

The UE 110 and the 5G NR-RAN 120 may perform a NAS registration procedure 610. The UE 110 may also establish an Internet PDU session 620 with the 5G NR-RAN 120. Those skilled in the art will understand the operations related to the NAS registration procedure 610 and establishing the Internet PDU session 620.

The UE 110 may then send an IMS support request 630 to the ES 170 using the data plane via the Internet PDU session. The IMS support request 630 may be a request for the ES 170 to indicate the non-voice IMS services that are supported by the 5G NR-RAN 120. It should be understood that the IMS support request 630 may include a request for each individual IMS service that is supported by the UE 110 or a single request that requests all the non-voice IMS services supported by the 5G NR-RAN 120. For example, if the UE 110 supports IMS SMS services and IMS RCS services, the UE 110 may send two IMS support requests 630, one for each of the UE 110 IMS supported services. On the other hand, if the UE 110 supports any non-voice IMS services, the UE 110 may send a single IMS support request 630 that requests the ES 170 to indicate all the 5G NR-RAN 120 supported non-voice IMS services.

The ES 170, via the data plane, will send an IMS support response 640 corresponding to each of the one or more IMS support requests 630 to indicate the 5G NR-RAN 120 supported non-voice IMS services. When the IMS support response 640 indicates that the 5G NR-RAN 120 supports at least one of the non-voice IMS services that are supported by the UE 110, the UE 110 may initiate an IMS PDU session with the IMS 150 by sending an IMS PDU Session Establishment Request 650. The IMS 150 may then respond with an IMS PDU Session Establishment Response 660 to establish the IMS PDU session. The operations 650 and 660 are carried out if there is an overlap between the non-voice IMS services supported by both the UE 110 and the 5G NR-RAN 120. If there is no overlap (e.g., commonly supported services), the UE 110 will not attempt to establish the IMS PDU session.

After the IMS PDU session is established, the UE 110 may establish an IMS SIP registration 670 with the IMS 150 to access the non-voice supported IMS services. Thus, the signaling diagram 600 shows an exemplary manner of determining whether the UE 110 should attempt to access non-voice IMS services when IMS VoPS services are not supported based on information received over the data plane from an ES 170 that includes information corresponding to a supported feature set for the 5G NR-RAN 120.

Figure 7:
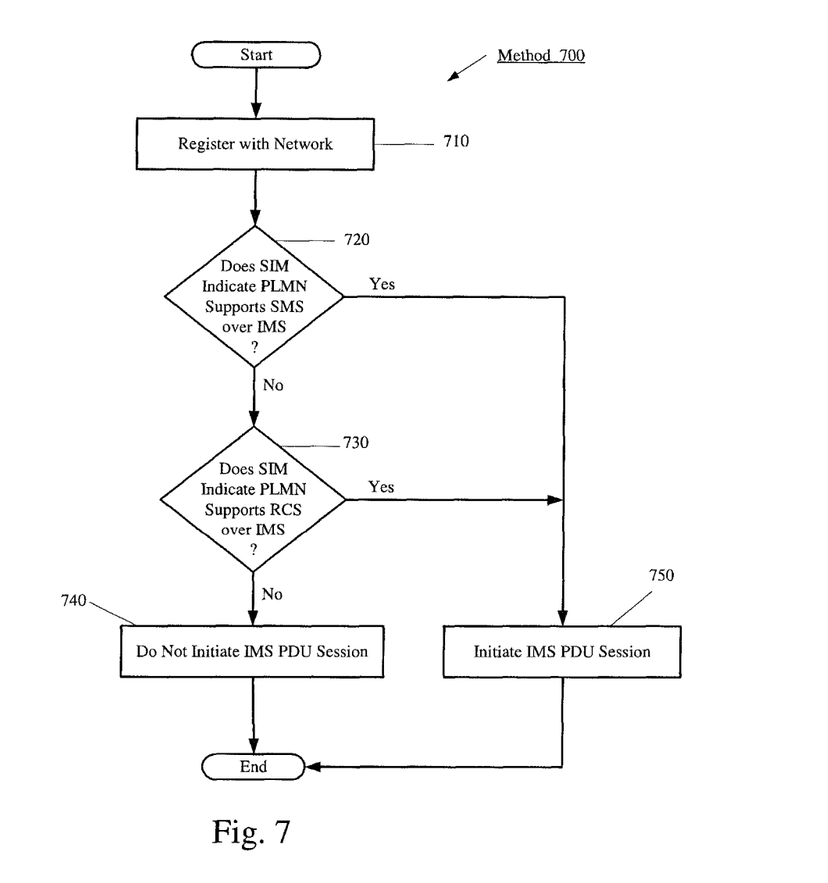
FIG. 7 shows an exemplary method of UE operation when the UE includes a subscriber identification module (SIM) card including information concerning supported non-voice IMS services according to various exemplary embodiments.

FIG. 7 shows an exemplary method 700 of UE operation when the UE 110 includes a subscriber identification module (SIM) card including information concerning supported non-voice IMS services according to various exemplary embodiments. The method 700 will be described with reference to the exemplary network arrangement of FIG. 1 and the exemplary UE 110 of FIG. 2. As described above, the UE 110 may include a SIM card or an eSIM. The SIM card may store information related to various PLMNs. The information may include the supported non-voice IMS services for each PLMN, including the 5G NR-RAN 120. It should be understood that the SIM card may initially include information concerning the users Home PLMN (HPLMN). However, as the user roams to other networks, the SIM card may store information for Visited PLMNs (VPLMNs). Those skilled in the art will understand that SIM cards may be updated with new information and other information may be removed and/or altered from the SIM card. Thus, the information stored on the SIM card related to the supported non-voice IMS services for various PLMNs may be updated as necessary. The use of the feature information on the SIM card will now be described with reference to method 700.

In 710, the UE 110 will initiate a network registration procedure with the 5G NR-RAN 120. Those skilled in the art will understand the operations involved in the network registration procedure. When the registration is successful, the 5G NR-RAN 120 will send a registration accept message to the UE 110. The registration accept message will include the IE corresponding to the IMS VoPS services. In this exemplary embodiment, it may be considered that the IMS VoPS service IE indicates that the 5G NR-RAN 120 does not support VoPS services.

In 720, when the UE 110 understands that the 5G NR-RAN 120 does not support IMS VoPS services, the UE 110 will query the SIM card (or eSIM) to determine if there is stored information corresponding to the 5G NR-RAN 120 supporting SMS over IMS. If the SIM card indicates that the 5G NR-RAN 120 supports SMS over IMS services, the UE 110, in 750, will initiate the IMS PDU session to access the IMS services. Again, the UE 110 will perform operation 720 when the UE 110 supports SMS over IMS.

If the UE 110 does not support SMS over IMS or if the SIM card does not indicate the 5G NR-RAN 120 supports SMS over IMS, the method 700 continues to 730 where the UE 110 will query the SIM card (or eSIM) to determine if there is stored information corresponding to the 5G NR-RAN 120 supporting RCS over IMS. If the SIM card indicates that the 5G NR-RAN 120 supports RCS over IMS services, the UE 110, in 750, will initiate the IMS PDU session to access the IMS services. Again, the UE 110 will perform operation 730 when the UE 110 supports RCS over IMS.

If the UE 110 does not support RCS over IMS or if the SIM card does not indicate the 5G NR-RAN 120 supports RCS over IMS, the method 700 continues to 740 where the UE 110 will not initiate an IMS PDU session because the UE 110 and the 5G NR-RAN 120 do not have overlapping IMS service support. Thus, in the method 700, the UE 110 will determine whether to initiate an IMS PDU session for non-voice IMS services based on information stored in the SIM card (or eSIM) of the UE 110.

Similar to the method 400, those skilled in the art will understand that the method 700 may extended to account for additional IMS services that are supported by the UE 110 and/or the 5G NR-RAN 120.

Figure 8:
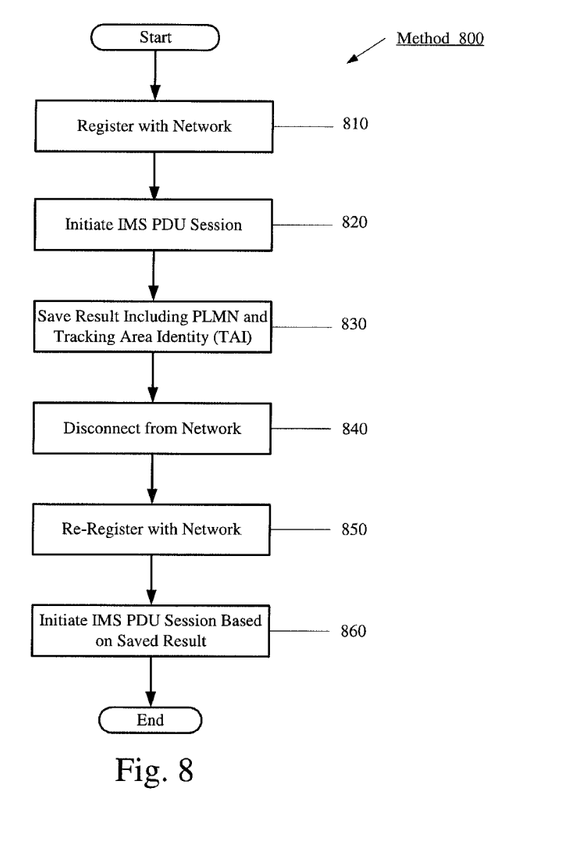
FIG. 8 shows an exemplary method of UE operation when the UE saves fingerprint information concerning supported non-voice IMS services according to various exemplary embodiments.

FIG. 8 shows an exemplary method 800 of UE operation when the UE 110 saves fingerprint information concerning supported non-voice IMS services according to various exemplary embodiments. The method 800 will be described with reference to the exemplary network arrangement of FIG. 1 and the exemplary UE 110 of FIG. 2. The method 800 is related to the UE 110 saving fingerprint information concerning whether a particular network supports non-voice IM services such that when the UE 110 reconnects to the network, the UE 110 understands whether to initiate an IMS PDU session to access the non-voice IMS services.

In 810, the UE 110 will initiate a network registration procedure with the 5G NR-RAN 120. Those skilled in the art will understand the operations involved in the network registration procedure. When the registration is successful, the 5G NR-RAN 120 will send a registration accept message to the UE 110. The registration accept message will include the IE corresponding to the IMS VoPS services. In this exemplary embodiment, it may be considered that the IMS VoPS service IE indicates that the 5G NR-RAN 120 does not support VoPS services.

In 820, the UE 110 will initiate an IMS PDU session establishment procedure with the 5G NR-RAN 120. The UE 110 will initiate this procedure despite the fact that IMS VoPS services are not available. The purpose of this procedure is to determine whether the 5G NR-RAN 120 supports any non-voice IMS services. The UE 110 will not receive any indication as to the support of non-voice IMS services during the registration procedure. Thus, the UE 110 will attempt to initiate the IMS PDU session establishment to determine if any non-voice IMS services are supported.

As described above, the fact that the IMS PDU session establishment was rejected does not indicate, on its own, that the 5G NR-RAN 120 does not support the non-voice IMS services because the IMS PDU session establishment may have been rejected for different reasons. However, in one exemplary embodiment, if the PDU session establishment was rejected, the UE 110 may assume that the non-voice IMS services are not supported by the 5G NR-RAN 120. In another exemplary embodiment, the UE 110 may initiate the IMS PDU session establishment in 820 multiple times (e.g., twice, thrice, etc.). If the PDU session is rejected multiple times, the UE 110 may assume the non-voice IMS services are not supported by the 5G NR-RAN 120.

In 830, the UE 110 will save the result of the attempt to establish the IMS PDU session, either positive or negative. This result may be stored in, for example, the memory arrangement 210 of the UE 110. The stored result may include an identification of the PLMN and the Tracking Area Identity (TAI) corresponding to the stored result. It should be noted that throughout this description, it has been described that the 5G NR-RAN 120 may support or not support the non-voice IMS services. However, the support may be at a finer granularity than the entire 5G NR-RAN. For example, a carrier may deploy a 5G NR-RAN over a large geographical area. In some of the geographical areas, the 5G NR-RAN may support the non-voice IMS services, while in other geographical areas the 5G NR-RAN may not support the non-voice IMS services. Thus, the stored result may include the TAI for the UE 110 to understand the cells in the 5G NR-RAN 120 that support the non-voice IMS services and the cells in the 5G NR-RAN 120 that do not support the non-voice IMS services. This finer granularity may apply to any of the exemplary embodiments.

At some later time, the UE 110 will disconnect 840 from the 5G NR-RAN 120. Then, at a still later time, the UE 110 may re-register 850 with the 5G NR-RAN 120. When the registration is successful, the 5G NR-RAN 120 will send a registration accept message to the UE 110. The registration accept message will include the IE corresponding to the IMS VoPS services. In this exemplary embodiment, it may be considered that the IMS VoPS service IE indicates that the 5G NR-RAN 120 does not support VoPS services.

In 860, the UE 110 will not blindly attempt to initiate the IMS PDU session. Rather, the UE 110 will query the memory arrangement 210 and determine whether there is information stored for the 5G NR-RAN, e.g., any results concerning previous attempts at establishing an IMS PDU session including the PLMN and TAI information. If there is stored information, the UE 110 will determine whether the IMS PDU session establishment was successful or unsuccessful. If successful, the UE 110 will again initiate an IMS PDU session establishment with the 5G NR-RAN 120. If the previous attempt was not successful, the UE 110 will not attempt to establish a new IMS PDU session. If there are no corresponding results for the PLMN and TAI, the UE will attempt to initiate a IMS PDU session (820) and store the result (830) for future use.

Thus, the method 800 provides that the UE 110 stores fingerprint information for previous IMS PDU session establishment with a network based on PLMN and TAI. This fingerprint information is then used to determine if the UE 110 should attempt to establish a PDU session during future registrations with the network. It should be understood that the exemplary embodiments re described with reference to storing the results including PLMN and TAI information. However, other parameters may be used to determine whether a particular 5G NR-RAN (or subset of the 5G NR-RAN) supports non-voice IMS services.

The methods 400, 500, 700 and 800 and signaling diagram 600 show various manners for the UE 110 to determine whether a network supports non-voice IMS services. As described above, this determination is typically made after the UE 110 is made aware that the network does not support IMS VoPS services using an explicit indication from the network. This is because, in some situations, if the network and the UE 110 support IMS VoPS services, the UE 110 will initiate a IMS PDU session establishment and when the PDU session is established the UE 110 will have access to all supported IMS services, voice and non-voice services. Thus, the exemplary embodiments are concerned with the scenario where the network does not support the IMS VoPS and the UE 110 determines whether to initiate an IMS PDU session for non-voice IMS services. However, there are situations where the network supports IMS services for voice and indicates this support in the VoPS IE. However, the network does not support SMS over IMS, or RCS over IMS. If this network interacted with a UE that had the exact opposite feature support, i.e. UE does not support IMS voice, but UE supports RCS over IMS, the exemplary embodiments described in this disclosure will help in this case as well.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
    determining that a network with which the UE is communicating does not support a voice over packet switch (VoPS) service;
    in response to determining the network does not support the VoPS service, determining whether the network supports a first non-voice IP Multimedia Subsystem (IMS) service wherein the first non-voice IMS is an IP Multimedia Subsystem (IMS) Short Messaging Service (SMS);
    in response to determining the network does not support the first non-voice IMS service, determining whether the network supports a second non-voice IMS service wherein the second non-voice IMS service is an IMS Rich Communications Service (RCS); and
    when the network supports the second non-voice IMS service, initiating an IMS Protocol Data Unit (PDU) session establishment with the network.

2. The processor of claim 1, wherein the determining whether the network supports the non-voice IMS service is based on a non-voice IMS service information element (IE) received from the network.

3. The processor of claim 2, wherein the non-voice IMS service IE comprises one of a separate indication for each supported non-voice IMS service or a single indication that the network supports one or more non-voice IMS services.

4. The processor of claim 1, wherein, when the network does not support the non-voice IMS service, the UE does not initiate an IMS Protocol Data Unit (PDU) session establishment with the network.

5. The processor of claim 1, wherein the determining whether the network supports the non-voice IMS service is based on information stored in one of a Subscriber Identify Module (SIM) card or an eSIM of the UE.

6. The processor of claim 1, wherein the determining whether the network supports the non-voice IMS service comprises:
    requesting information from an entitlement server deployed on an Internet via a data plane of the network, wherein the information comprises the non-voice IMS services supported by the network.

7. The processor of claim 6, wherein the operations further comprise:
    performing a non-access stratum (NAS) procedure with the network; and
    establishing an Internet PDU session with the network.

8. The processor of claim 1, wherein the determining whether the network supports the non-voice IMS service is based on a previous interaction between the UE and the network.

9. The processor of claim 8, wherein the previous interaction includes recording an indication of the public land mobile network (PLMN) and tracking area identity (TAI) of the network.

10. The processor of claim 1, wherein the determining that the network supports the IMS RCS service is based on a non-voice IMS service information element (IE) in a registration accept message.

11. The processor of claim 1, wherein determining whether the network supports the IMS SMS is based on a first bit of a 1 byte Information Element (IE) and determining whether the network supports the IMS RCS is based on a second bit of the 1 byte IE.

12. A user equipment (UE), comprising:
a transceiver configured to communicate with a network; and
a processor communicatively coupled to the transceiver and configured to perform operations comprising:
determining that the network does not support a voice over packet switch (VoPS) service;
in response to determining the network does not support the VoPS service, determining whether the network supports a first non-voice IP Multimedia Subsystem (IMS) service wherein the first non-voice IMS is an IP Multimedia Subsystem (IMS) Short Messaging Service (SMS);
in response to determining the network does not support the first non-voice IMS service, determining whether the network supports a second non-voice IMS service wherein the second non-voice IMS service is an IMS Rich Communications Service (RCS); and
when the network supports the second non-voice IMS service, initiating an IMS Protocol Data Unit (PDU) session establishment with the network.

13. The UE of claim 12, wherein the determining whether the network supports the non-voice IMS service is based on a non-voice IMS service information element (IE) received from the network.

14. The UE of claim 12, wherein the determining whether the network supports the non-voice IMS service is based on information stored in one of a Subscriber Identify Module (SIM) card or an eSIM of the UE.

15. The UE of claim 12, wherein the determining whether the network supports the non-voice IMS service comprises:
requesting information from an entitlement server deployed on an Internet via a data plane of the network, wherein the information comprises the non-voice IMS services supported by the network.

16. The UE of claim 12, wherein the determining whether the network supports the non-voice IMS service is based on a previous interaction between the UE and the network.

17. A processor of a user equipment (UE) configured to perform operations comprising:
determining that a network with which the UE is communicating does not support an IP Multimedia Subsystem (IMS) voice over PS (VoPS) service;
initiating an IMS Protocol Data Unit (PDU) session establishment with the network;
receiving an IMS PDU session rejection including a cause code indicating whether the network supports a non-voice IMS service; and
when the cause code indicates the network supports the non-voice IMS service, initiating a second IMS PDU session establishment with the network.

18. The processor of claim 17, wherein the operations further comprise: when the cause code indicates the network does not support the non-voice IM service, the UE does not initiate a second IMS PDU session establishment with the network.

19. The processor of claim 17, wherein the non-voice IMS service comprises one of a Short Messaging Service (SMS) over IMS service or a Rich Communications Services (RCS) over IMS service or another service provided via a network slice connected to an IMS Data network name (DNN).

20. The processor of claim 17, wherein the second IMS PDU session establishment is initiated after a predetermined backoff period from the first IMS PDU session establishment.

* * * * *